United States Patent [19]

Yukimoto et al.

[11] Patent Number: 5,063,270
[45] Date of Patent: * Nov. 5, 1991

[54] CURABLE COMPOSITION

[75] Inventors: Sadao Yukimoto; Toshifumi Hirose; Hiroshi Wakabayashi; Katsuhiko Isayama, all of Hyogo, Japan

[73] Assignee: Kanegafuchi Kagaku Kogyo Kabushiki Kaisha, Osaka, Japan

[*] Notice: The portion of the term of this patent subsequent to Apr. 30, 2008 has been disclaimed.

[21] Appl. No.: 362,776

[22] Filed: Jun. 7, 1989

[30] Foreign Application Priority Data

Jun. 10, 1988 [JP] Japan ................. 63-144013

[51] Int. Cl.$^5$ ................. C08K 5/09
[52] U.S. Cl. ................. 524/306; 524/378; 524/588; 524/700; 524/755; 524/773; 525/403; 525/477; 525/479; 525/437; 525/476; 528/25; 528/34; 528/26; 528/265; 427/387; 427/393.5; 428/447
[58] Field of Search ............. 525/403, 477, 479, 476, 525/437; 528/25, 34, 26, 26.5; 524/588, 306, 378, 700, 755, 773; 428/447; 427/387, 393.5

[56] References Cited

U.S. PATENT DOCUMENTS

| 4,463,115 | 7/1984 | Hirose et al. | 524/270 |
| 4,735,829 | 4/1988 | Hirose et al. | 525/403 |
| 4,788,254 | 11/1988 | Kawakubo et al. | 528/18 |
| 4,902,575 | 2/1990 | Yukimoto et al. | 524/366 |
| 4,906,707 | 3/1990 | Yukimoto et al. | 525/403 |

*Primary Examiner*—Melvyn I. Marquis
*Attorney, Agent, or Firm*—Armstrong, Nikaido, Marmelstein, Kubovcik & Murray

[57] ABSTRACT

A curable composition. The composition contains
(A) 100 parts of an oxyalkylene polymer having at least one silicon-containing group containing a hydroxyl group and/or hydrolyzable group bound to a silicon atom and capable of crosslinking through the formation of a siloxane bond;
(B) 1 to 150 parts of a high molecular weight and/or high viscosity plasticizer; and
(c) 0.1 to 20 parts of a compound having one silanol group per molecular and/or a compound capable of reacting with moisture to thereby form one silanol group per molecule. When an alkyd paint is applied onto the surface of a cured material formed from this curable composition excellent coating properties can be obtained, the other physical characteristics of the cured material being maintained.

12 Claims, No Drawings

CURABLE COMPOSITION

FIELD OF THE INVENTION

This invention relates to a curable composition which comprises an oxyalkylene polymer containing a silicon-containing group, having a hydroxyl group and/or a hydrolyzable group bound to a silicon atom and being capable of crosslinking through the formation of a siloxane bond. The composition gives a cured material excellent in coating properties.

BACKGROUND OF THE INVENTION

An oxyalkylene polymer which contains a silicon-containing group having a hydroxyl group and/or a hydrolyzable group bound to a silicon atom and capable of crosslinking through the formation of a siloxane bond, which will be simply called a reactive silicon group hereinafter, is disclosed in, for example, JP-A-52-73998 (the term of "JP-A" herein means unexamined Japanese patent application). A typical example thereof is a polymer represented by the following general formula:

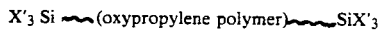

X'$_3$Si⌒⌒(oxypropylene polymer)⌒⌒SiX'$_3$ wherein X' represents a hydrolyzable group such as a methoxy group.

Similar to a room temperature curing silicon rubber, an oxyalkylene polymer containing a reactive silicon group crosslinks through the formation of a siloxane bond (Si—O—Si) between polymer molecules at room temperature under the effects of, for example, moisture in the atmosphere, thus giving a rubber-like cured material. The cured material thus obtained, which is excellent in, for example, stretching properties and strength, is widely used for various purposes, e.g., in sealants and adhesives.

The surface of the cured material is frequently coated. It is one of the advantages of this cured material that it can be coated with almost any paint commonly used in coating cured materials, different from room temperature curing silicone rubbers, since the main chain of the former material comprises the oxyalkylene polymer. In the case of a silicone rubber, on the other hand, the water and oil repellent surface cannot be coated with any paint in practice.

An oxyalkylene polymer containing a reactive silicon group is frequently used together with a plasticizer. When the plasticizer is a low molecular weight one commonly used in the art, however, an alkyd paint applied on the cured polymer shows poor drying characteristics, though coating is not impossible. Therefore it is difficult in practice to coat the cured material with an alkyd paint. Accordingly it is almost impossible to coat a cured oxyalkylene polymer, which is used together with a low molecular weight plasticizer, with an alkyd paint.

A plasticizer is conveniently used to lower the viscosity of a composition and to thereby improve the workability or to improve the tensile properties of a cured material. Accordingly the inventors have attempted to find a plasticizer which will not affect negatively the drying characteristics of an alkyd paint. As a result, the inventors previously found that the abovementioned problem can be solved by utilizing a so-called high molecular weight plasticizer.

However a cured material wherein a high molecular weight plasticizer is used has a disadvantageously high modulus. Although the modulus can be lowered by adding a large amount of the plasticizer, the resulting material becomes poor in the tensile properties and stretching properties. It is desirable to readily control the modulus, which is one of important characteristics, of a rubber material without affecting negatively any of the other characteristics of the same.

SUMMARY OF THE INVENTION

It is an object of the present invention to provide a curable composition containing an oxyalkylene polymer, which has a reactive silicon group, capable of giving a cured material which has excellent coating properties, when coated with an alkyd paint, and a low modulus.

It is another object of the present invention to provide a curable composition which comprises an oxyalkylene polymer having a reactive silicon group capable of giving a cured material excellent in alkyd paint properties and a low modulus and which can be readily prepared.

Accordingly, the present invention provides a (A) 100 parts (by weight, the same will apply hereinafter) of an oxyalkylene polymer which has at least one silicon-containing group having a hydroxyl group and/or hydrolyzable group bound to a silicon atom and capable of crosslinking through the formation of a siloxane bond;

(B)1 to 150 parts of a high molecular weight and/or high viscosity plasticizer; and (c) 0.1 to 20 parts of a compound having one silanol group per molecule and/or a compound capable of reacting with moisture to thereby form one silanol group per molecule; and provides a process for coating a cured material obtained from said curable composition with an alkyd paint.

DETAILED DESCRIPTION OF THE INVENTION

The oxyalkylene polymer having at least one reactive silicon group to be used in the present invention, which will be called the oxyalkylene polymer (A) hereinafter, can be selected from among those described in, for example, U.S. Pat. Nos. 3,971,751; 3,979,384 and 4,323,488; JP-B-45-36319 (the term "JP-B" means examined Japanese patent publication), JP-B-46-12154 and 49-32673, JP-A-50-156599, 51-83561, 546096, 55-82123, 55-123620, 55-125121, 55-131022, 55-135135 and 55-137129.

The oxyalkylene polymer (A) has a recurring unit represented by the following general formula:

—R$^1$—O—

Wherein R$^1$ represents an optionally substituted divalent hydrocarbon group having 1 to 12 carbon atoms.

The main chain of the oxyalkylene polymer can either consist of a recurring unit of the general formula —R$^1$—O— alone or include other recurring unit(s). When it includes recurring unit(s) other than the one defined above, the recurring unit of the general formula —R$^1$—O—  can preferably amount to at least 60% (by weight, the same will apply hereinafter), still more preferably, at least 80%, of the whole main chain.

It is preferable that R$^1$ is an optionally substituted divalent alkyl group having 2 to 5 carbon atoms, still more preferably, an alkylene group having 3 or 4 carbon atoms. Examples of the $R^1$ include

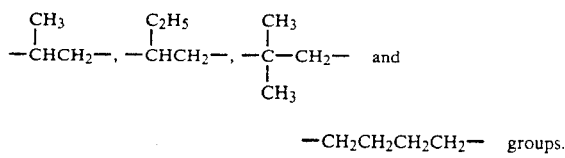  groups.

A

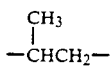

group is particularly preferred.

The molecular chain of the above mentioned oxyalkylene polymer (A) may consist of either one or two or more recurring units.

The reactive silicon group contained in the oxyalkylene polymer (A) is a well known functional group which can crosslink at room temperature. A typical example of this reactive silicon group is one represented by the following general formula (I):

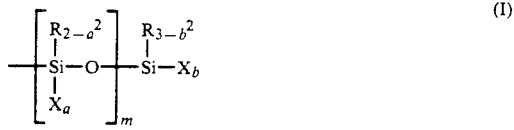

wherein $R^2$ represents a monovalent organic group having 1 to 40 carbon atoms, and in case two or more $R^2$ groups are present, they can be the same or different;

X is a hydroxyl or hydrolyzable group, and in case two or more X groups are present, they can be the same or different;

a is 0, 1 or 2;

b is 0, 1, 2 or 3, provided that $(ma+b) \geq 1$; and m is 0 or an integer of 1 to 19, and in case m is 2 or more, a is not necessarily the same throughout the m units of the formula:

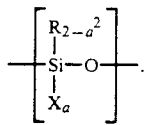

Among the reactive silicon groups of the general formula (I), those represented by the following general formula (II):

wherein $R^2$ is as defined above; and  is 1, 2 or 3; are preferable from the viewpoint of, for example, economics.

Examples of the hydrolyzable group represented by X in the general formula (I) include a halogen atom, a hydrogen atom, an alkoxy group, an acyloxy group, a ketoxymate group, an amino group, an amido group, an aminoxy group, a mercapto group and an alkenyloxy group. Among these groups, alkoxy groups such as methoxy and ethoxy groups are preferable since they can be moderately hydrolyzed.

Examples of the $R^2$ group in the general formula (I) include optionally substituted hydrocarbon groups having 1 to 40 carbon atoms and triorganosiloxy groups. Typical examples thereof are alkyl groups such as methyl, ethyl, chloromethyl and chloroethyl groups; cycloalkyl groups such as a cyclohexyl group; aryl groups such as a phenyl, chlorophenyl, and fluorophenyl groups; aralkyl groups such as benzyl, chlorophenyl and fluorophenyl groups; and triorganosiloxy groups represented by the general formula:

$(R^3)_3SiO-$ wherein $R^3$ is represents a monovalent organic group having 1 to 20 carbon atoms, provided that the three $R^3$s are not necessarily the same; such as a trimethylsiloxy group. Among these groups, a methyl group is particularly preferred as the $R^2$ group.

The oxyalkylene polymer can contain at least one at least 1.1, still more preferably, 1.5 to 4, reactive silicon groups on average in order to achieve sufficient curing properties. It is further preferred that the reactive silicon groups is located at the end of the molecular chain of the oxyalkylene polymer (A).

The number-average molecular weight of the oxyalkylene polymer (A) is preferably less than 30,000, still more preferably, from 5,000 to 15,000. Either an oxyalkylene polymer (A) alone or a mixture thereof can be used in the present invention.

The oxyalkylene polymer (A) can be prepared by various methods. For example, it can be obtained by reacting an oxyalkylene polymer having a functional group (group Y) with a compound having a functional group (group Y') capable of reacting with said group Y and containing a reactive silicon group to thereby introduce said reactive silicon group into the oxyalkylene polymer.

Particular examples of the abovementioned process include the following ones.

(1) An oxyalkylene polymer having an unsaturated group is reacted with a hydrosilane having a hydrolyzable group such as $HSi(OCH)_3$ in the presence of a catalyst such as a Group VIII transition metal compound in Periodic Table to thereby hydrosilylate said oxyalkylene polymer.

$CH_2=CHCH_2O$ (oxyalkylene polymer)$\sim OCH_2CH=CH_2+2\text{-}HSi(OCH_3)_3 \rightarrow (CH_3O)_3S\sim Si(CH_3)_3$.

(2) An oxyalkylene polymer having an unsaturated group is reacted with a compound having a mercapto group and a reactive silicon group such as $HS(CH_2)_3Si(OCH_3)_3$.

(3) An oxyalkylene polymer having an isocyanate group is reacted with a compound having an active hydrogen group and a reactive silicon group such as 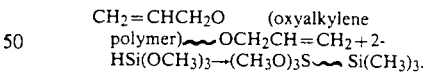

$OCNC_6H_4NHCOO\sim$(oxyalkylene polymer)$\sim OOCNHC_6H_4NCO+2H_2N(CH_2)_3Si(OCH_3)_3\rightarrow(CH_3O)_3Si\sim Si(OCH_3)_3$.

(4) An oxyalkylene polymer having a hydroxyl group is reacted with a compound having an isocyanate group and a reactive silicon group such as 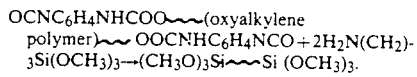

Among these processes, the one which comprises reacting an oxyalkylene polymer having an unsaturated group with a hydrosilane compound is frequently employed. The oxyalkylene polymer having an unsaturated group can be obtained by introducing the unsaturated group into an oxyalkylene polymer having a hydroxyl group by utilizing said hydroxyl group (cf. JP-A-54-6097).

However the oxyalkylene polymer (A) to be used in the present invention can be obtained by any method and is not restricted to those prepared by the above methods. Also, a polymer, which is obtained by polymerizing a polymerizable monomer such as a vinyl monomer in the presence of an oxyalkylene polymer (A), or a polymer having a modified polymer chain, which is obtained by polymerizing a polymerizable monomer in the presence of silicon group into the polymer thus obtained, can be used as the oxyalkylene polymer (A) in the present invention.

The high molecular weight and/or high viscosity plasticizer, which is used in the composition of the present invention together with the abovementioned oxyalkylene polymer (A), is employed in order to improve the drying characteristics of an alkyd paint applied on the surface of the cured material as compared with the drying characteristics when a low molecular weight plasticizer is employed.

The molecular weight of said high molecular weight plasticizer can range from 500 to 15,000, preferably from 700 to 10,000 and still more preferably, from 4,000 to 10,000.

Examples of the high molecular weight plasticizer include polyester plasticizers such as polyester of a dibasic acid and a divalent alcohol; polyethers such as polypropylene glycol and its derivatives; polystyrenes such as poly-α-methylstyrene and polystyrene; polydienes such as polybutadiene, butadiene/acrylonitrile copolymer, polychloroprene and polyisoprene; polybutene and hydrogenated polybutene, though the plasticizer is not restricted to these examples. Among these plasticizers, polyester plasticizers, polyethers, polystyrenes, polybutadiene and polybutene are preferable. Polyethers are particularly preferred since they are highly compatible with the oxyalkylene polymer (A) and can lower the viscosity of the composition to thereby improve the workability of the same.

Among these polyethers, those having a number-average molecular weight of 4,500 or above, more particularly 5,000 to 10,000, are particularly preferred.

These polyethers are highly compatible with the oxyalkylene polymer (A) and are effective in lowering the viscosity of the composition. Further, the use of these plasticizers prevent an undesirable increase in the modulus, which inhibits a decrease in the elongation. The polyether plasticizer preferably has a small number of molecular ends or a small number of terminal hydroxyl groups, from the viewpoint of improving the drying characteristics of an alkyd paint applied on the surface of the cured material. A polyether plasticizer substantially free from any terminal hydroxyl group is particularly preferred. Terminal hydroxyl groups may be replaced by, for example, alkyl ether or aryl ether groups. Furthermore the plasticizer preferably contains 10% (determined by GPC, the same will apply hereinafter) or less, and more preferably, 5% or less, of components of a number-average molecular weight of 1,000 or below in order to achieve excellent drying characteristics of an alkyd paint. From the viewpoint of the drying characteristics of an alkyd paint applied on the surface of the cured material, the polyether preferably has a narrow molecular weight distribution, namely a small ratio of the weight-average molecular weight ($\overline{M}w$) to the number-average molecular weight ($\overline{M}n$). The ratio $\overline{M}w/\overline{M}n$ is preferably 2 or below and more preferably, 1.6 or below.

Specific examples of these polyethers include polyoxypropylene glycol having a number-average molecular weight of 4,000 or above and a narrow molecular weight distribution or containing a small amount of components of a molecular weight of 1,000 or below; a material obtained by blocking one or, preferably, both terminal hydroxyl groups of said polyoxypropylene glycol with alkyl ether, alkyl phenyl ether, alkenyl ether or aryl ether bond(s); or a material obtained by blocking said terminal hydroxyl group(s) with alkyl, aryl or alkenyl group(s) through urethane, ester, urea, amide or carbonate bond(s), though the polyether is not restricted to these examples.

The molecular weight of the high viscosity plasticizer is not particularly limited, so long as it has a viscosity of 8 poise or above, preferably 20 to 300 poise, at 25° C. However, the viscosity of a plasticizer generally increases with an increase in its molecular weight. Thus most of high molecular weight plasticizers could also serve as high viscosity plasticizers.

Examples of the high viscosity plasticizer other than the high molecular weight ones include triaryldiethanes, isomeric mixtures thereof, 1-phenyl-1-xylylethane and chlorinated paraffin, though the high viscosity plasticizer is not restricted to these. Among these plasticizers, triaryldiethanes and isomeric mixtures thereof are preferred.

Either one of these plasticizers or a mixture thereof can be used in the present invention. These plasticizers may be blended with, for example, used as a solvent, in the preparation of the oxyalkylene polymer (A).

As described above, the high molecular weight plasticizer can be used in an amount of 1 to 150 parts, preferably 10 to 120 parts, and more preferably 20 to 100 parts, per 100 parts of the oxyalkylene polymer (A). When the content of the plasticizer is less than one part, the plasticizer cannot exert the desired plasticizing effect. When it exceeds 150 parts, on the other hand, the resulting cured material has poor mechanical strength.

In addition to the oxyalkylene polymer (A) and the high molecular weight and/or high viscosity plasticizer (B), the composition of the present invention comprises a compound having one silanol group per molecule and/or a compound capable of reacting with moisture to thereby form a compound having one silanol group per molecule, which will be called a monovalent silanol compound (C) hereinafter. The use of the component (C) effectively lowers the modulus of the cured oxyalkylene polymer (A) material. Additionally, this component (C) is highly advantageous since it is readily available and can exert the abovementioned effect when simply added to the oxyalkylene polymer (A).

As the compounds having a single silanol group per molecule which belong to the monovalent silanol compound (C), those having an

group in the molecule may be used without any restriction. Examples thereof include a compound represented by the following general formula:

(R⁴)₃SiOH wherein each R⁴ is the same or different from each other and each represents an optionally substituted alkyl or aryl group having 1 to 20 carbon atoms; such as (CH₃)₃SiOH, (CH₃CH₂)₃SiOH, (CH₃CH₂CH₂)₃SiOH,

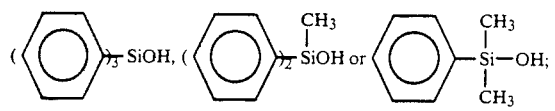

a cyclic polysiloxane compound having a silanol group such as

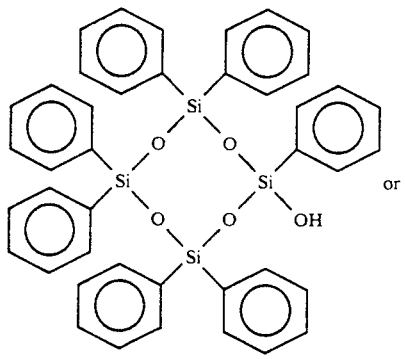

a chain polysiloxane compound such as

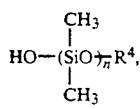

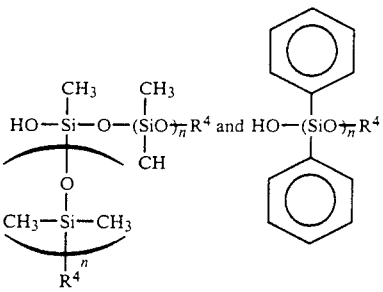

wherein R⁴ is as defined above; and n is an integer of 1 to 40.

The effect of lowering the modulus of the cured oxyalkylene polymer (A) would increase with an increase of the content of

group in the compound (C). Among these compounds, therefore, (CH₃)₃SiOH and (CH₃CH₂)₃SiOH are preferred while

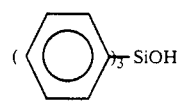

is preferred from the viewpoint of stability in the atmosphere and workability.

As the compound capable of reacting with moisture to thereby form a compound having a single silanol group in a molecule, which are useful as the monovalent silanol compound (C), derivatives of compounds represented by the general formula:

(R⁴)₃SiOH wherein R⁴ is as defined above; may be used.
Examples thereof include

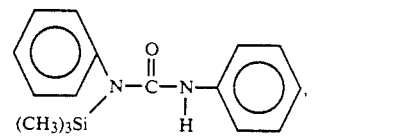

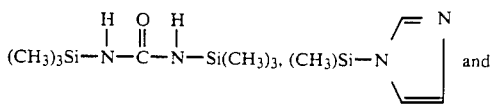

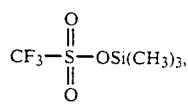

which are known so-called silylating agents. Among these compounds,

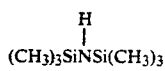

is particularly useful since it gives a high

content when hydrolyzed.

It is theorized that these compounds improve the tensile properties of the cured material through the following mechanism. Namely, they react with the reactive silicon group in the oxyalkylene polymer (A) and cap the same. Thus the number of crosslinkable points in said cured polymer is lowered and the molecular weight between corsslinkable points is increased thereby. As a result, the modulus of the cured material is lowered while the elongation of the same is elevated.

The monovalent silanol compound (C) may be used in an amount of 0.1 to 20 parts, preferably 0.5 to 10 parts, per 100 parts of the oxyalkylene polymer (A). Alternatively, the amount of the monovalent silanol compound (C) may be determined by calculating the silanol equivalent

per the reactive silicon group contained in the oxyalkylene polymer (A). Generally speaking, the silanol group may range from 0.1 to 0.9 equivalent for the reactive silicon group. However, it is preferable that at least one reactive silicon group which is not capped with said compound remains in a molecule of the oxyalkylene polymer (A). The silanol equivalent may exceed 0.9, though it is not advantageous from an economical standpoint.

The composition of the present invention may further contain other additives such as a curing accelerator or a filler, if required.

Examples of the curing accelerator useful in the present invention include organotin compounds, acidic phosphates, a product obtained by a reaction between an acidic phosphate and an amine, a saturated or unsaturated polyvalent carboxylic acid or an acid anhydride thereof and organic titanates.

Examples of the organotin compounds include dibutyltin dilaurate, dioctyltin dimaleate, dibutyltin phthalate, tin octylate and dibutyltin methoxide.

The phosphates include phosphates containing a

moiety such as an organic phosphate

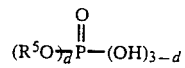

(wherein d is 1 or 2 and $R^5$ represents an organic group). Particular examples thereof include

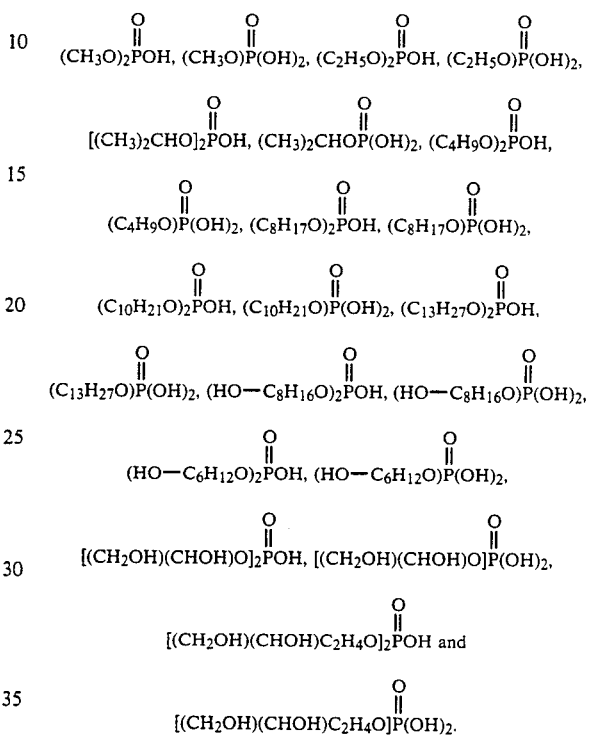

Examples of the organic titanates include titanates such as tetrabutyl titanate, tetraisopropyl titanate and triethanolamine titanate.

These curing accelerators may be preferably used in an amount of 0.1 to 10 parts per 100 parts of the oxyalkylene polymer (A).

Examples of the filler include heavy calcium carbonate, light calcium carbonate, precipitated calcium carbonate, kaolin, talc, silica, titanium oxide, aluminum silicate, magnesium oxide, zinc oxide and carbon black. These fillers are preferably used in an amount of 10 to 300 parts per 100 parts of the oxyalkylene polymer (A).

In addition, other additives including an anti-sagging agent such as hydrogenated castor oil or organic bentonite, a colorant, an anti-aging agent or an adhesive may be used in the present invention.

As a matter of course, the composition of the present invention may contain a low molecular weight plasticizer such as dioctyl phthalate, so long as it does not inhibit the achievement of the effects of the present invention.

The composition of the present invention thus obtained may be effectively used as, for example, a sealing composition, a templating composition, a casting rubber material, a foamed material, an adhesive, a paint or a waterproofing paint.

For example, a constructional sealant may be obtained in the following manner. 10 to 300 parts of inorganic filler(s) such as calcium carbonate, talc or kaolin are added to the composition of the present invention. A pigment such as titanium oxide or carbon black and an anti-aging agent such as an UV absorber or a radical chain terminator are added thereto, if required. The mixture thus obtained is thoroughly kneaded in a kneader or a paint roller and then exposed to moisture in the atmosphere. Thus a rubber elastomer having excellent properties can be obtained.

An alkyd paint may be applied to the surface of the composition of the present invention which has been cured.

The alkyd paint is not particularly restricted. For example, those comprising a so-called oil-modified alkyd resin, which is obtained by reacting a polybasic acid anhydride such as phthalic anhydride or maleic anhydride with a polyhydric alcohol such as glycerol, pentaerythritol, ethylene glycol or trimethylolethane and modifying the condensate thus obtained with an oil such as linseed oil, soybean oil, castor oil or safflower oil or a fatty acid, or a modified alkyd resin, which is obtained by modifying an alkyd resin with various resins or vinyl monomers, as the main component can be employed. The alkyd paint can be in any form, for example, an alkyd resin varnish or an alkyd resin enamel for coating, e.g., automobiles, aircarfts or machines; an alkyd resin-containing paint, which is also called a synthetic resin-containing paint, for painting, e.g., buildings, bridges and marine structures; and an alkyd resin undercoating for coating, e.g., automobiles, machines, electric instruments and furnitures.

To further illustrate the present invention, the following Examples will be given.

SYNTHESIS EXAMPLE 1

800 g of a polyoxypropylene polymer, to 97% of the total terminals of which allyl ether groups had been introduced, having an average molecular weight of approximately 8,000 was introduced into a pressure reactor provided with a stirrer. 19 g of methyldimethoxysilane was added thereto. Then 0.34 ml of a chloroplatinic acid catalyst solution, which had been prepared by dissolving 8.9 g of $H_2PtCl_6 \cdot 6H_2O$ in 18 ml of isopropyl alcohol and 160 ml of tetrahydrofuran, was added thereto and the mixture was allowed to react at 80° C. for 6 hours.

The hydrogenated silicon group remaining in the reaction mixture was determined by IR spectrometry. As a result, it was found that few hydrogenated silicon group remained there. When the reactive silicon group was determined by NMR, it was found that the obtained polyoxtpropylene polymer contains 1.7

$$(CH_3O)_2\overset{\overset{\displaystyle CH_3}{|}}{Si}CH_2CH_2CH_2O-$$

group per molecule at the molecular ends.

EXAMPLES 1 TO 4 AND COMPARTIVE EXAMPLES 1 TO 6

To 100 g of the polymer prepared in Synthesis Example 1 were added 120 g of calcium carbonate (CCR; mfd. by Shiraishi Kogyo K.K.) and 20 g of titanium dioxide (R820; mfd. by Ishihara Sangyo K.K.), which were used as fillers; 2 g of aminosilane (KBM 602; mfd. by The Shin-Etsu Chemical Co., Ltd.) which was used as an adhesive; 2 g of dibutyltin diacetylacetonate (U-220; mfd. by Nitto Chemical K.K.) which was used as a curing catalyst; and 50 g of the plasticizer and 2 g of the monovalent silanol compound (C), each specified in Table 1. The obtained mixture was thoroughly kneaded with a three valler paint mill and then a sheet of 3 mm in thickness was-prepared.

The obtained sheet was cured at 23° C. for one day. Then two alkyd paints, namely, Rubbol AZ mfd. by Sikkens Co. and Rock Coat mfd. by Rock Paint Co., were separately applied on the surface of the cured sheet. After allowing to stand at 23° C for the period specified compared with each other. Further the H-type tensile properties were examined according to JIS A 5758 by utilizing a glass substrate. Table 1 summarizes the results.

In Table 1, Polybutene HV35 is a polybutene of a molecular weight of approximately 750 (mfd. by Nippon Oil Chemical Co., Ltd.), Excenol 5030 is a polyether polyol of a molecular weight of approximately 5100 (mfd. by Asahi Glass Co., Ltd.), Plasticizer A is an oxypropylene polymer having allyl ether groups at the both ends (Mn=5200, Mw/Mn=1.6), Plasticizer B is a hydroxyl group-free oxypropylene polymer having an allyl ether group at the both ends (Mn=7500, Mw/Mn=1.8), DOP is di(2-ethylhexyl)phthalate of a molecular weight of 391 (mfd. by Daihachi Kagaku K.K.) and BBP is butylbenzyl phthalate of a molecular weight of 312 (mfd. by Daihachi Kagaku K.K.).

The evaluation shown in Table 1 is based on the following criterion.

5: The applied paint was completely cured.

4: The applied paint was cured, though its surface was somewhat sticky.

3: A little amount of the paint adhered to fingers in a finger test.

2: The paint was partially cured but adhered to fingers in a finger test.

1: The applied paint became more viscous.

0: The applied paint showed no change, i.e., not cured.

TABLE 1

| Example No. | Plasticizer | Monovalent silanol Compound (C) | Alkyd paint drying Characteristics | | | | | | H-type tensile properties | | |
|---|---|---|---|---|---|---|---|---|---|---|---|
| | | | Rubbol Az | | | Rock Coat | | | $M_{100}*1$ | $T_B*1$ | $E_B*1$ |
| | | | 1 | 3 | 7 | 1 | 3 | 7 | (kg/cm²) | (kg/cm²) | (%) |
| 1 | Polybutene HV35 | 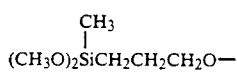 | 1 | 1 | 2 | 2 | 3 | 3 | 2.9 | 8.3 | 460 |
| 2 | Excenol 5030 | $(CH_3)_3Si\overset{\overset{\displaystyle H}{|}}{N}Si(CH_3)_3$ | 0 | 1 | 2 | 1 | 2 | 2 | 2.9 | 7.9 | 420 |

TABLE 1-continued

| Example No. | Plasticizer | Monovalent silanol Compound (C) | Alkyd paint drying Characteristics | | | | | | H-type tensile properties | | |
|---|---|---|---|---|---|---|---|---|---|---|---|
| | | | Rubbol Az | | | Rock Coat | | | $M_{100}$*1 (kg/cm²) | $T_B$*1 (kg/cm²) | $E_B$*1 (%) |
| | | | 1 | 3 | 7 | 1 | 3 | 7 | | | |
| 3 | Plasticizer A | " | 1 | 2 | 3 | 2 | 3 | 3 | 2.8 | 7.8 | 440 |
| 4 | Plasticizer B | (CH₃)₃Si—O— | 1 | 2 | 3 | 2 | 3 | 4 | 3.1 | 8.2 | 460 |
| Comparative 1 | DOP | — | 0 | 0 | 0 | 0 | 0 | 0 | 4.1 | 8.9 | 410 |
| Comparative 2 | BBP | — | 0 | 0 | 0 | 0 | 0 | 0 | 4.2 | 8.8 | 400 |
| Comparative 3 | Polybutene HV35 | — | 1 | 2 | 2 | 2 | 3 | 3 | 4.2 | 8.4 | 330 |
| Comparative 4 | Excenol 5030 | — | 0 | 1 | 2 | 1 | 2 | 2 | 4.0 | 8.9 | 380 |
| Comparative 5 | Plasticizer A | — | 1 | 2 | 2 | 2 | 3 | 3 | 4.0 | 8.5 | 350 |
| Comparative 6 | Plasticizer B | — | 1 | 2 | 3 | 2 | 3 | 4 | 4.1 | 9.0 | 390 |

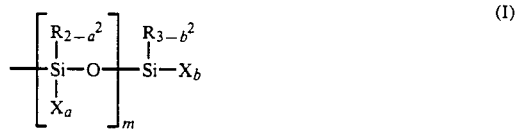

Note *1
$M_{100}$: Stress at 100% elongation (100% modulus).
$T_B$: Breaking strength.
$E_B$: Breaking elongation.

Table 1 indicates that the use of low molecular weight plasticizers would considerably retard the curing of the alkyd paints (cf. Comparative Examples 1 and 2). In these cases, the alkyd paints were not cured after being allowed to stand at 23° C. for seven days. When no monovalent silanol compound (C) was used, the modulus of the obtained product was excessively high to be used as a sealant. When high molecular weight plasticizers were used together with monovalent silanol compounds (C), the curing properties of the alkyd paints and the modulus of the obtained products as a sealing were improved (cf. Examples 1 to 4).

REFERENCE EXAMPLE

The procedure of Example 1 was repeated except that the substrate to be painted was replaced by a conventional one.

Table 2 shows the results.

TABLE 2

| Rubbol Az | | Rock Coat | |
|---|---|---|---|
| 1 day | 2 days | 1 day | 2 days |
| 4 | 5 | 4 | 5 |

While the invention has been described in detail and with reference to specific embodiments thereof, it will be apparent to one skilled in the art that various changes and modifications can be made therein without departing from the spirit and scope thereof.

What is claimed is:
1. A curable composition which comprises:
(A) 100 parts by weight of oxyalkylene polymer which has at least one silicon-containing group containing a hydroxyl group and/or hydrolyzable group bound to a silicon atom and capable of crosslinking through the formation of a siloxane bond;
(B) 1 to 150 parts by weight of a plasticizer having a number-average molecular weight from 500 to 15,000 and selected from the group consisting of a polyester, a polyether, a polystyrene, a polydiene, a polybutene and a hydrogenated polybutene; and
(C) 0.1 to 20 parts by weight of a compound having one silanol group per molecule and/or a compound capable of reacting with moisture to thereby form one silanol group per molecule.

2. The composition of claim 1, wherein the oxyalkylene polymer has a recurring unit represented by the formula:

$$-R^1-O-$$

where $R^1$ is a divalent hydrocarbon group having 1 to 12 carbon atoms.

3. The composition of claim 1, wherein the silicon-containing group is represented by formula (I):

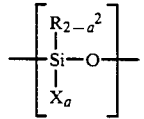

wherein
$R^2$ is an optionally substituted monovalent organic group having 1 to 40 carbon atoms, and when two or more $R^2$ groups are present, are the same or different;
X is a hydroxyl or hydrolyzable group, and when two or more X groups are present, are the same or different;
a is 0, 1 or 2; and
b is 0, 1, 2 or 3, provided that $ma+b \geq 1$ and that a is not necessarily the same throughout m units of the formula:

$$\left[ \begin{array}{c} R_{2-a}^2 \\ | \\ -Si-O- \\ | \\ X_a \end{array} \right]$$

and
m is 0 or an integer of 1 to 19.

4. The composition of claim 3, wherein X is selected from the group consisting of a hydrogen atom, a halogen atom, a hydroxyl group, an alkoxy group, an acyloxy group, a ketoxymate group, an amino group, an amido group, an aminooxy group, a mercapto group and an alkenyloxy group.

5. The composition of claim 3, wherein X is an alkoxy group.

6. The composition of claim 3, wherein X is a methoxy group.

7. The composition of claim 1, wherein said plasticizer has a number-average molecular weight of from 700 to 10,000.

8. The composition of claim 1, wherein said plasticizer is a polyether having a number-average molecular weight of 4,500 or above.

9. The composition of claim 1, wherein said plasticizer is a polyether containing no hydroxyl group.

10. The composition of claim 1, wherein said compound having one silanol group per molecule is the one represented by the general formula:

$$(R^4)_3SiOH$$

wherein $R^4$ may be the same or different and each represents an optionally substituted alkyl or aryl group having 1 to 20 carbon atoms.

11. The composition of claim 1, wherein said compound capable of reacting with moisture to thereby form a compound having a silanol group per molecule is a compound which is capable of reacting with moisture to form a compound represented by the formula:

$$(R^4)_3SiOH$$

wherein each $R^4$ may be the same or different and represents an optionally substituted alkyl or aryl group having 1 to 20 carbon atoms.

12. A process for preparing a rubber material coated with an alkyd paint comprising the steps of:
  (1) curing a curable composition which comprises:
    (A) 100 parts by weight of an oxyalkylene polymer which has at least one silicon-containing group containing a hydroxyl group and/or hydrolyzable group bound to a silicon atom and capable of crosslinking through the formation of a siloxane bond;
    (B) 1 to 150 parts by weight of a plasticizer having a molecular weight from 500 to 15,000 and/or a viscosity of at least 8 poise; and
    (C) 0.1 to 20 parts by weight of a compound having one silanol group per molecule and/or a compound capable of reacting with moisture to thereby form one silanol group per molecule; and
  (2) applying an alkyd paint to the cured composition.

* * * * *